(12) United States Patent
Kaufman, Jr.

(10) Patent No.: US 7,966,389 B2
(45) Date of Patent: Jun. 21, 2011

(54) SYSTEM AND METHOD FOR APPLICATION PROGRAMMING INTERFACE FOR EXTENDED INTELLIGENT PLATFORM MANAGEMENT

(75) Inventor: Gerald J. Kaufman, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2666 days.

(21) Appl. No.: 10/420,584

(22) Filed: Apr. 22, 2003

(65) Prior Publication Data

US 2004/0249913 A1 Dec. 9, 2004

(51) Int. Cl.
*G06F 15/173* (2006.01)
*G06F 15/167* (2006.01)
*G06F 11/30* (2006.01)

(52) U.S. Cl. .................... 709/223; 709/215; 702/182

(58) Field of Classification Search .............. 709/210, 709/215, 223; 702/182–188
See application file for complete search history.

(56) References Cited

U.S. PATENT DOCUMENTS

| 6,496,790 | B1 * | 12/2002 | Kathavate et al. | 702/188 |
| 6,772,099 | B2 * | 8/2004 | Merkin et al. | 702/188 |
| 7,069,349 | B2 * | 6/2006 | Hawkins et al. | 710/15 |
| 2003/0130969 | A1 * | 7/2003 | Hawkins et al. | 706/15 |
| 2004/0228063 | A1 * | 11/2004 | Hawkins et al. | 361/115 |

FOREIGN PATENT DOCUMENTS

| JP | 07-239775 | 9/1995 |
| JP | 10-240707 | 9/1998 |
| JP | 2000-214914 | 8/2000 |
| JP | 2001-027906 | 1/2001 |

OTHER PUBLICATIONS

IPMI—Intelligent Platform Management Interface Specification, v. 1.5, Document Revision 1.1, Feb. 20, 2002.
English Translation of Japan Office Action, dated Aug. 24, 2006, 5 pages.
"Itanium 2 32 way server RAS Control Firmware", NEC technical report, NEC Corp, Feb. 25, 2003, vol. 56, No. 1, 6 pages.
"Server Management Specification IPMI v1.5 is Defined" Nikkei Windows 2000, Nikkei BP Corp, May 1, 2001, 3 pages.

* cited by examiner

*Primary Examiner* — John B. Walsh

(57) ABSTRACT

A system for controlling a computer system uses a management controller having sensor data record objects in a sensor data record repository. Sensor data record objects contain data from a plurality of sensors, and at least one sensor data record object contains a property descriptor. The property descriptor references a property data object readable and writeable by a controlling computer through the management controller, and provides a way to control at least one feature of the computer system.

11 Claims, 4 Drawing Sheets

SYSTEM AND METHOD FOR APPLICATION PROGRAMMING INTERFACE FOR EXTENDED INTELLIGENT PLATFORM MANAGEMENT

FIELD

The present Application Programming Interface (API) provides a system and method for extending Intelligent Platform Management Interface (IPMI) to provide large numbers of writeable, as well as readable, sensor and property records for control of computer systems including partitionable multiprocessor computer systems.

Introduction to IPMI

Intelligent Platform Management Interface (IPMI) is a protocol used for controlling computer systems, such as network server computers. IPMI assumes presence of a management processor in each controlled computer, such that logging, monitoring, inventory, and recovery operations are independent of primary processors in the controlled computer systems. A detailed description of IPMI can be obtained from the Intel website at http://www.intel.com/design/servers/ipmi. The IPMI Version 1.5 revision 1.1 specification is available from Intel, enclosed herewith, and incorporated herein by reference.

IPMI defines common interfaces to "intelligent" hardware used to monitor and control a server computer's physical health, such as temperature, voltage, fan operation, and power supplies. These capabilities provide information that enables remote system management, recovery, and asset tracking. IPMI provides for remote computer system management over serial, modem and IAN connections between a controlling computer system and the Baseboard Management Controller (BMC) of the controlled computer system. The controlling computer may also be the controlled computer.

A BMC is a primary management controller for a system. The BMC may communicate with Satellite Management Controllers (SMC) within the system over a serial interface, derived from the industry-standard $I^2C$ protocol, known as the Intelligent Platform Management Bus (IPMB). SMCs may be located on other circuit boards and in other devices of the system than is the BMC. IPMI provides commands to allow a controlling computer to access information from SMCs, and provide commands to SMCs, through the BMC.

IPMI messaging uses a request/response protocol. IPMI request messages are commonly referred to as commands (Cmd). IPMI commands are grouped into functional command sets, using a field called the Network Function Code (NetFn), which serves in part to address the BMC or an SMC with which a command is associated. There are predefined command sets for sensor and event-related commands, chassis commands, and other functions.

The BMC maintains a centralized, non-volatile System Event Log (SEL), which is a repository for system critical events, such as out-of-range temperatures, power supply failures, and uncorrectable ECC errors. BMCs may maintain a list of Satellite Management Controllers (SMCs).

The BMC maintains a single, centralized, non-volatile SDR Repository, which holds Sensor Data Records (SDRs) for all IPMI-accessible sensors in the system. An SDR identifies and completely describes a sensor, including the sensor's default initialization settings that BMC uses at system initialization. An SDR also holds offsets and constants for converting raw sensor readings to standard units (such as milliamps or volts). System Management Software uses the SDR information to get the sensor locations and conversion factors. Sensors include much information of interest in managing a system and include system status information as well as voltage, temperature, and fan speed readings. SDRs may include parameters that can be written by a controlling computer, such as temperature and voltage limits.

Many sensor types are defined in the IPMI specification; the specification also provides for extensions to cover additional sensor types. IPMI commands are specified by a NetFn byte and a Cmd byte; there may also be an associated data field. Extended commands generally make use of NetFn and Cmd byte codes reserved for OEM extensions. IPMI extensions for both commands and sensor types are keyed to a manufacturer-id associated with the particular Original Equipment Manufacturer (OEM).

Shortcomings OF IPMI Extensions

This mechanism limits the number of extensions available to those reserved in the IPMI specification. In particular, IPMI defines available sensor identifications such that only sensor identifications OCOH-OFFH are available—unless other techniques are used—this limits OEM sensor extensions to no more than 64 sensor types.

While many sensor types are predefined in the IPMI specification, these do not include support for modern high-performance, repartitionable, computer systems capable of running more than one operating system simultaneously. Systems such as these require use of OEM command and sensor extensions under IPMI. Further, IPMI sensors typically are read-only.

Even a large company such as Hewlett-Packard has only one manufacturer-ID, therefore these sensor and command codes must be shared throughout all devices produced by the company. Further, should any sensor or command codes be reused with the same manufacturer-ID, confusion and system incompatibility may be expected. It is therefore desirable to extend the number of available sensor types and command codes for use with systems produced by the same manufacturer.

Typically, IPMI-controlled systems require a series of OEM-defined IPMI commands to control them. Typically, controlling systems must have knowledge of the OEM-defined commands implemented in each IPMI-controlled system. This is generally done by building a table of available commands for each possible controlled system into controlling system applications. This system tends to break down when there is a large variety of possible system configurations. It is desirable to implement an improved system whereby a controlling system can discover the commands implemented by a controlled system.

The IPMI specification also fails to provide a lock-unlock mechanism for accessing sensors having SDR size such that not all sensor information can be transferred in a single command response.

Introduction to SNMP

Simple Network Management Protocol (SNMP) is a protocol commonly used by a controlling computer system, known as a manager, to manage and control devices, such as switches and routers and known as agents, within a computer network. Agents are typically network interconnect devices, not server computers. SNMP typically operates through SNMP instructions and responses embedded in User Datagram Protocol (UDP) or Internet Protocol (IP) packets and transmitted over a computer network between the manager and the agents. No predetermined network connection is required between manager and agent, each SNMP command is typically encapsulated with manager and agent addresses and is transmitted independently across the network.

The SNMP protocol implements the following commands, which are be addressed by the manager to a particular agent:
get OID (retrieve operation)
get_next OID (traversal operation)
get_response OID (indicative operation)
set OID (alter operation)
trap The get, get_next, get_response, and set operations of SNMP include an object identifier (OID). The OID is typically a sequence of integers. The OID is an identifier attached to these commands and is used to indicate a target variable, or object, within the agent. SNMP systems require implementation of a Management Information Block (MIB) datastructure of addressable objects within each agent. The MIB comprises multiple objects in a tree structure.

SUMMARY

The present Application Programming Interface (API) provides a system and method for providing large numbers of sensor types having readable and writeable properties. The resulting enhanced IPMI can support powerful partitionable multiprocessor computer systems.

A pair of OEM commands are added to IPMI, these are a "get property" and a "set property" command. Each command is capable of reading or writing a large number of "property" records. Property records are of variable length, and are permitted to be greater than IPMI's maximum message length.

An OEM-defined SDR record type is also added; each instance of this SDR record type in the sensor data record repository contains information about a property record accessible on a particular machine.

In alternative embodiments, property data record may be larger than a maximum communication allowed under IPMI. A lock and unlock mechanism is provided to prevent conflicts between processes accessing the property records. Multiple copies of IPMI management software running on multiple controlling computers can therefore coexist simultaneously.

DETAILED DESCRIPTION OF THE EMBODIMENTS

Figure 1:
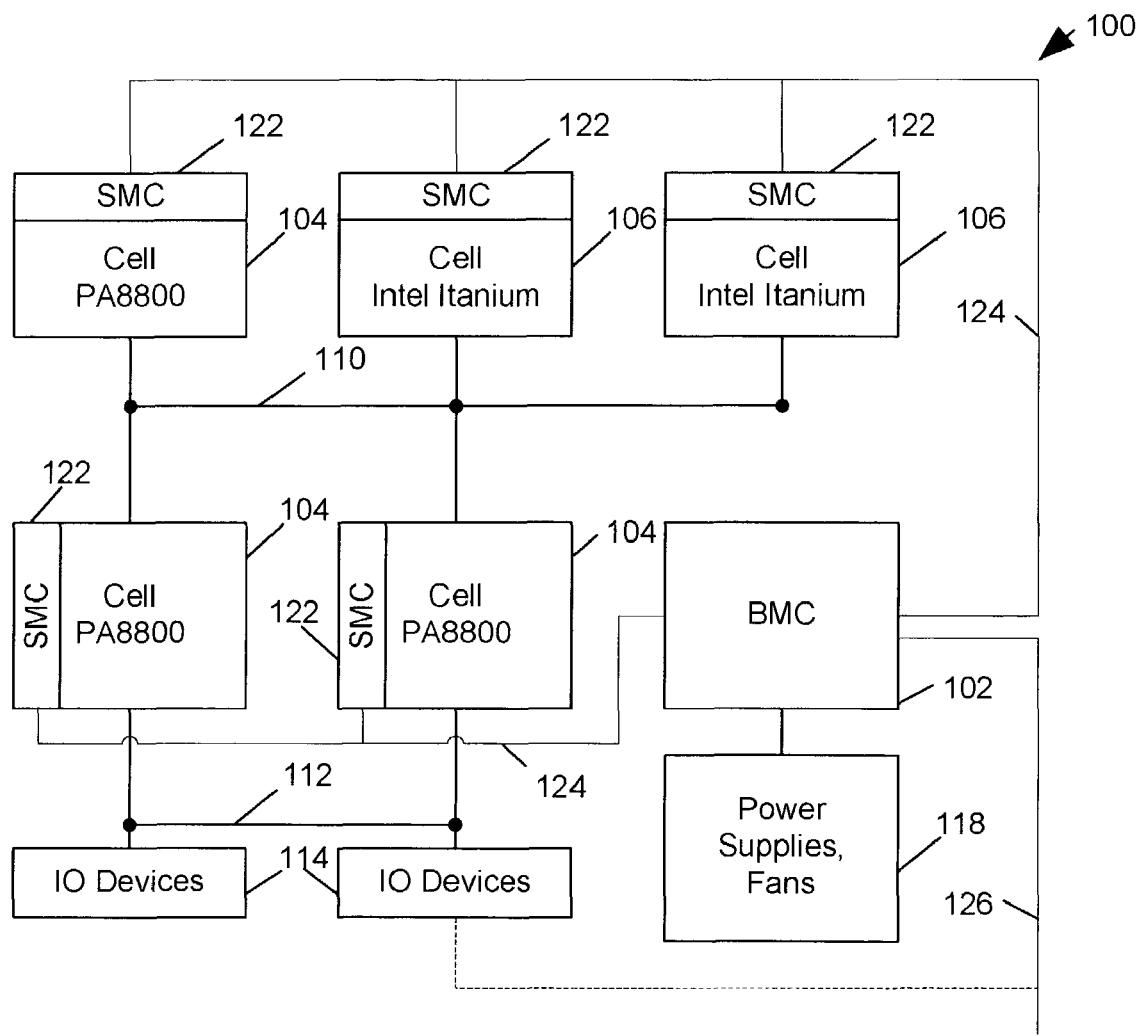
FIG. 1 is a block diagram of a partitionable computer system equipped with a BMC and several SMCs, and coupled to a controlling computer.
Figure 2:
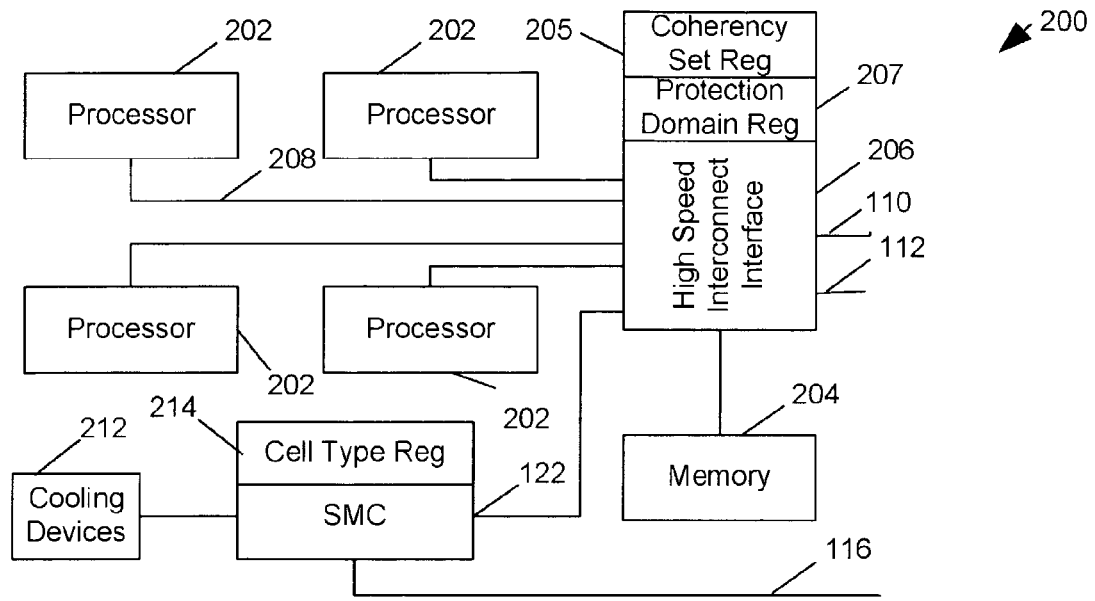
FIG. 2 is a detailed block diagram of a cell of the partitionable computer system of FIG. 1.

A computer system 100 (FIG. 1) has a baseboard management controller (BMC) 102, one or several processor cells 104, 106. Processor cells 104, 106 are of two or more ISA types. FIG. 2 is a detailed block diagram of a cell, such as cells 104, 106 of FIG. 1. With reference to FIG. 1 and FIG. 2, processor cells 104, 106 each have primary processors 202. Processor cells 104 embody primary processors of a first instruction set architecture (ISA) type, while processor cells 106 may embody processors of a second ISA type. For purposes of this document, a computer system is a heterogeneous computer system if it has primary processors of two or more ISA types, whether located on separate cells or not. In a particular embodiment, processor cells 104 embody processors 202 of the PA8800 type, while processor cells 106 embody processors 202 of the Intel Itanium type. In an embodiment, each cell has four primary processors, in another embodiment each cell has sixteen processors.

Cells of the system 100 are interconnected through high-speed interconnect 110. High-speed interconnect 110 provides for communications between cells. Some cells of the system 100 may also be coupled to I/O (Input/Output) interconnect 112. I/O interconnect 112 provides a path for communication between cells of the system, such as cell 104, and I/O devices 114. I/O devices 114 may include disk drives and network interface devices, as well as other peripherals.

Each cell has one or more Satellite Management Controllers (SMCs) 122, that communicates with the BMC through one or more Intelligent Platform Management Busses (IPMB) 124. The BMC also has a connection 126 to permit a controlling computer to access the BMC via Intelligent Platform Management Interface (IPMI) commands. Management controller 102 is also coupled to control and monitor power supplies and fans 118, and other system devices. Power supply voltages and processor and power supply temperatures are monitored through analog to digital converters at the SMCs and BMC, with appropriate physical sensors such as thermistors.

In addition to primary processors 202, each cell 200 (FIG. 2), such as cells 104, 106, also has a memory system 204, and a high-speed interconnect interface device 206. In a particular embodiment, high speed interconnect interface device 206 includes crossbar switching circuits, bus bridging circuits, and memory control circuits. In an embodiment, high speed interconnect interface device 206 includes a protection domain register 207 for specifying a protection domain to which the cell is assigned. High speed interconnect interface device 206 interfaces processor busses, such as processor bus 208, from primary processors 202 to memory system 204, to at least one high-speed system interconnect 110, and I/O interconnect 112.

Memory 204 of each cell is accessible from processors 202 of that cell, and from high speed interconnect 110. The high speed interconnect interface device 206 is capable of using protection domain register 207 to limit access to memory 204 by high speed interconnect 110 to references originating at cells assigned to the protection domain specified in protection domain register 207. Protection domains correspond to partitions of the system. Protection domain register 207 therefore enforces partitioning of the system by restricting memory access of memory 204 to cells of a particular partition.

A portion of system memory may be configured as Globally Shared Memory (GSM). In an alternative embodiment, a portion of memory 204 of one or more cells is configurable to serve as GSM memory. GSM memory is controlled through Coherency Set (CS) registers 205. The CS registers 205 include protection domain information whereby protection domains may be specified for each region of GSM memory. References to regions of GSM memory are rejected if they originate in processors assigned to protection domains, and hence partitions, other than those specifically permitted to access the region according to CS registers 205. These partitions allow the system to simultaneously run multiple operating systems in single or multiple copies.

In one embodiment, primary processors 202 of each cell each are large integrated circuits each having multiple CPUs (Central Processor Units) together with multiple levels of cache memory. In one version of this embodiment, each processor 202 has four CPUs. It is anticipated that the number of effective CPUs per processor 202 may be greater than four.

Each cell also has an SMC 122. SMC 122 is adapted for communication over IPMB 124. In a particular embodiment, SMC 122 controls cell-level cooling devices 212, and is capable of monitoring temperatures of the cells primary processors 202, as well as configuring CS registers 205. SMCs on cells have a cell type register 214 for indicating processor types on that cell.

Previously existing IPMI specifications lack adequate commands and sensor types to control CS registers 205, multiple high speed interconnect interfaces 206, protection domain registers 207, and other features of complex cellular, potentially heterogeneous, computer systems such as that illustrated. Complex systems like these are best managed with an enhanced IPMI having OEM-defined extended commands, sensor types, and sensor data records.

Figure 3:
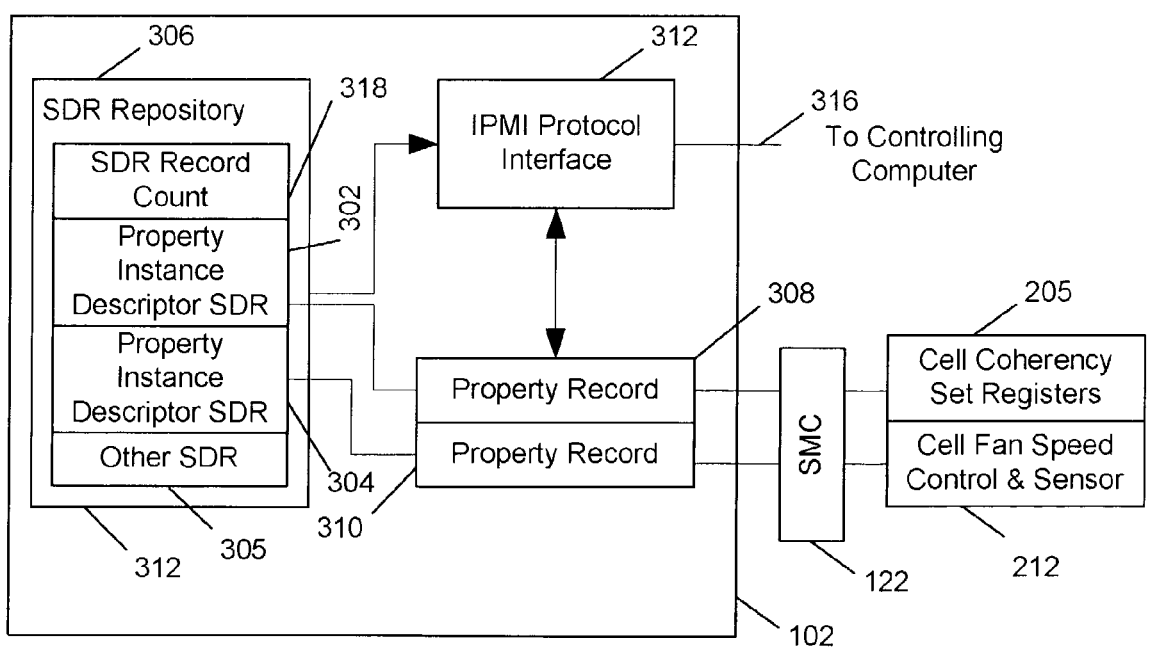
FIG. 3 is a block diagram of a controlled system illustrating SDR records in the SDR repository that identify property records accessible on a controlled computer and their interaction with an IPMI interface.

In the block diagram of a controlled system of FIG. 3, logical connections are illustrated between SDR records 302, 304, 305, also known as SDR objects, in the SDR repository 306 of the BMC 102 and property records 308, 310, also known as property objects, accessible to the BMC 102. Both the SDR repository 306 and property records 308, 310 are accessible through the BMC 102 and its IPMI protocol interface 312 of the BMC. Property records 308, 310 may be located in the BMC, may be located in any SMC 122 or any device of the system accessible to the BMC (at the system designer's option.

Figure 4:
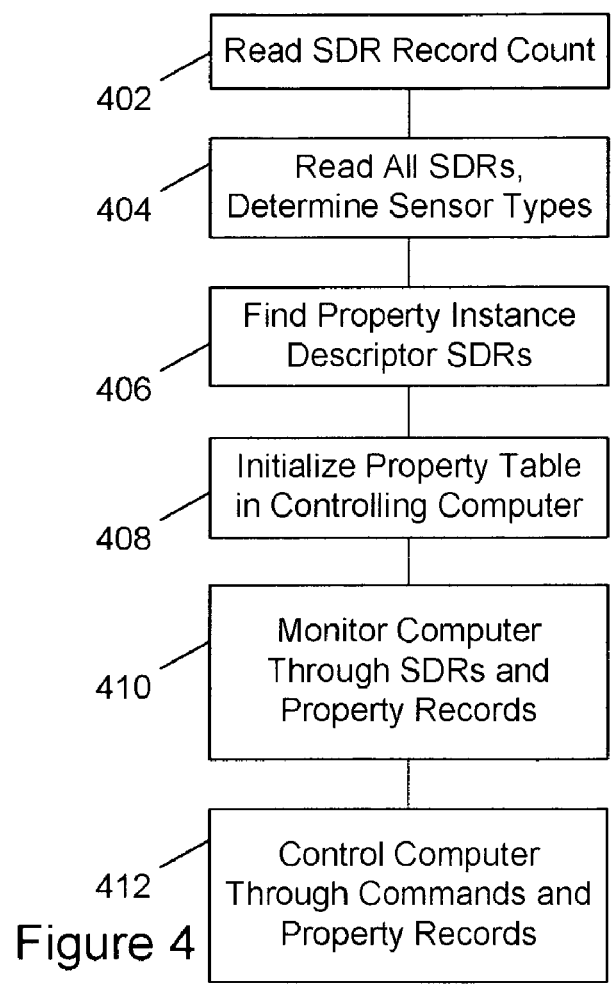
FIG. 4 is an exemplary, abbreviated, flowchart illustrating actions taken by a controlling computer.

Shortly after a controlling computer (not shown) connects over an IPMI connection 316 to the controlled computer, it reads 402 (FIG. 4) an SDR record count 318 from the SDR repository 306. Next, the controlling computer reads 404 the SDR records 302, 304, 305 from the SDR repository, and determines sensor types associated with each SDR record 302, 304, 305.

While reading 404 the SDR records 302, 304, 305, the controlling computer finds 406 any property descriptor SDR records 302, 304 in the SDR repository 306, and initializes 408 a property table in the controlling computer. Once SDR types have been determined 404 and the property table initialized, the controlling computer can monitor 410 the controlled system. The controlling computer then has the information necessary to control 412 the controlled computer through IPMI commands and writeable property records 308, 310.

Figure 5:
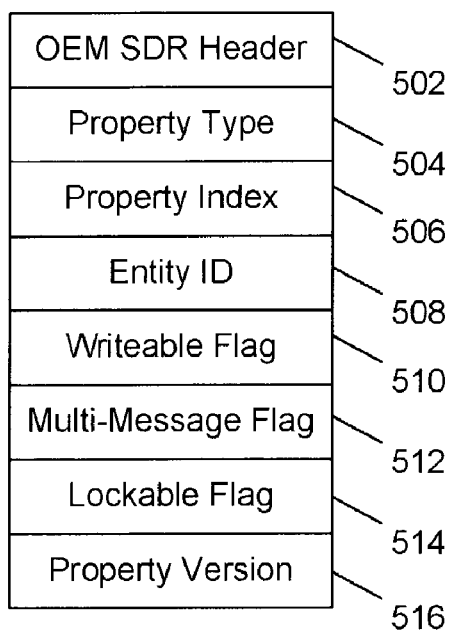
FIG. 5 illustrates abbreviated contents of a SDR for indicating a location and type of a property record.

FIG. 5 illustrates abbreviated contents of a property instance descriptor SDR 302, 304. Each property instance descriptor SDR 302 has an OEM SDR header 502 compliant with the IPMI specification, this header contains an SDR type byte that indicates that the SDR is a property instance descriptor SDR. It also has a property type 504, that describes a type of the property referenced, and a property index through which the associated property record 308 can be located. Each property instance descriptor SDR 302 also has an associated entity identifier 508 that identifies an entity, such as a particular cell 104 of the controlled computer system, a writeable flag 510, a multiple-message-enable flag 512, and a lockable flag 514.

Each property SDR may contain one or more optional version identifiers 516 to allow versioning of property SDRs, property types and the property commands. This provides fine grained versioning control lacking in standard IPMI. SMCs of different revisions, accessible through the same BMC, may implement a property differently if they provide different property version numbers in the associated property SDR.

Property SDRs are implemented as nested variant records or objects with the property type being the variant selector. There are optional, additional, fields in the property SDR that may be present in some types of property SDRs.

When multiple-message-enable flag 512 is active, the associated property record 308 may be written or read with multiple messages. This multiple message read/write capability permits support of property records 308 that exceed IPMI's maximum message transfer length.

When reading a property record with multiple messages, it is ordinarily possible for a property record to change between messages. In order to prevent changing records from causing confusion, properties are lockable with a Lock Property command, and unlockable with an Unlock Property command. Properties may be lockable or not lockable, those properties that are lockable are marked with a lockable flag 514 in the associated property instance descriptor SDR 302, 304.

Lockable properties may be read or written only if the get or set property command contains a valid access key. Two commands are provided to support locking: lock property and unlock property. A successful lock property command locks a specified property and returns an access key for use by a particular management utility running on a controlling computer to identify its commands as authorized. While a property is locked, it may not be locked a second time, further attempts to lock the property by the same or another controlling computer return an error status. Unlock property relinquishes the lock and invalidates the access key.

In alternate implementations, separate read and write locks may be implemented and multiple read locks allowed, thus permitting simultaneous reading of a property by multiple controlling computers.

A locked property is automatically unlocked when the property is set. Thus a successful set property command will automatically unlock the property, while a set property command that fails will not.

Figure 6:
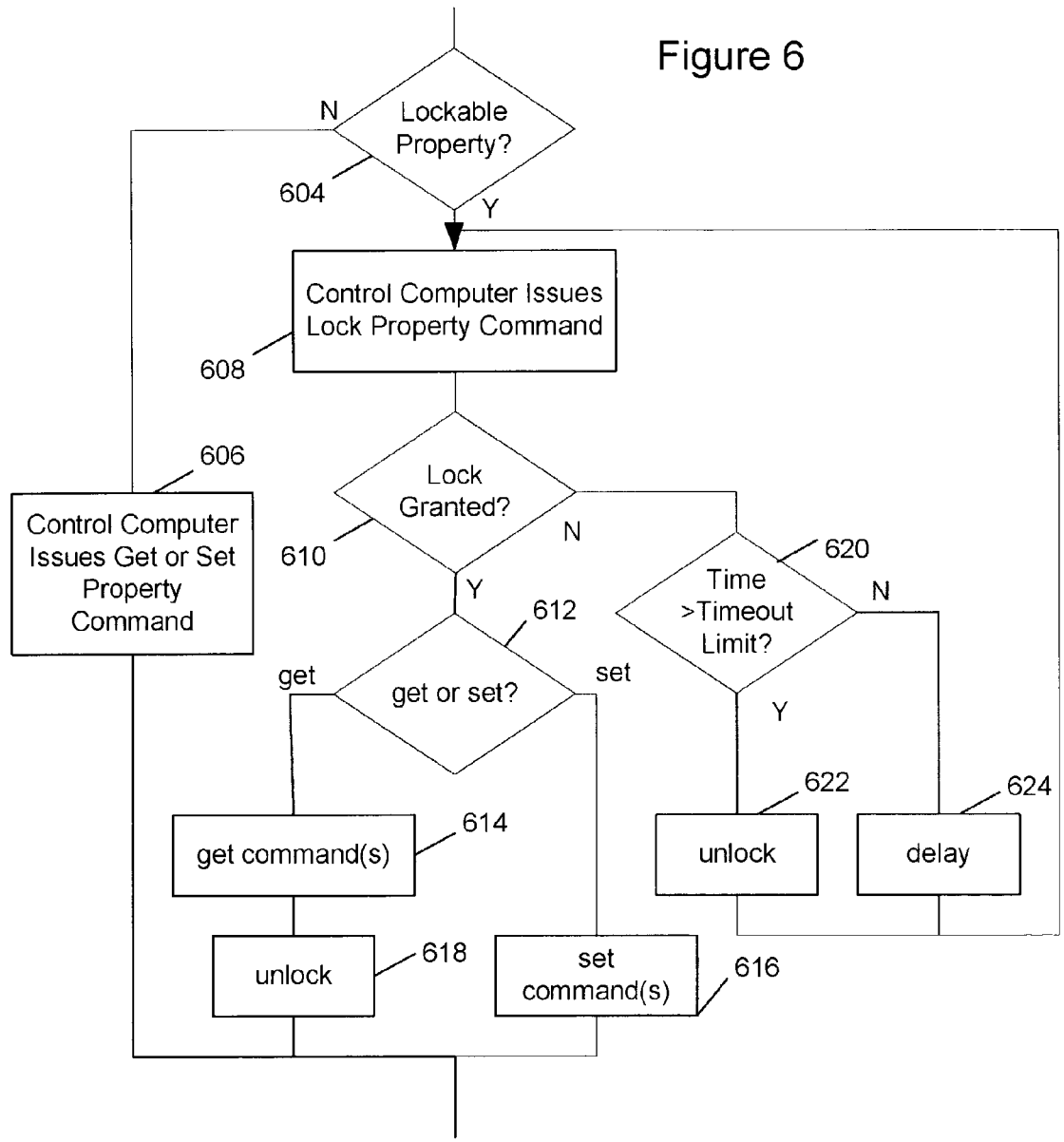
FIG. 6 is an abbreviated illustrative flowchart showing how a controlling computer uses the lock command when accessing property records.

When a management utility running on a controlling computer accesses a property record 308, the management utility first checks 604 (FIG. 6) its property table to determine if the property was marked lockable in the associated property instance descriptor SDR 302. If the property was not lockable, the management utility on the control computer issues 606 the get property or set property command required to access the property record. If the property was lockable, the controlling computer issues 608 a lock property command. If 610 the management controller granted lock, indicated by no error in status returned by the lock property command, the controlling computer issues a sequence of set property 616 or get property 614 commands as required to access the property record.

Since set property 614 commands act to unlock the property, if 612 the command issued is a set property command, no unlock property command 618 is required. If 61 the command issued was one or more get property 614 commands, an unlock property command 618 is issued.

If 610 the management controller did not grant lock, the controlling computer checks 620 a timestamp returned by the lock property command 608 to determine an elapsed time since the last successful lock property command referencing that particular property record 308. If 620 the time since the last successful lock property is greater than a timeout limit, the controlling computer issues an unlock 622 property command and retries the lock property command 608. If 620 the time since the last successful lock property command is less than the timeout limit, the controlling computer delays 622 and retries the lock property command 608.

In addition to one or more control computers, the BMC 102 may obtain a lock on a property to prevent a controlling computer from reading or changing the property while the BMC 102 is processing data associated with that property.

While the foregoing has been particularly shown and described with reference to particular embodiments thereof, it will be understood by those skilled in the art that various other changes in the form and details may be made without departing from the spirit hereof. It is to be understood that various changes may be made in adapting the description to different embodiments without departing from the broader concepts disclosed herein and comprehended by the claims that follow:

What is claimed is:

1. A system for controlling a computer system comprising:
a management controller; and
a plurality of sensors coupled to the management controller;
wherein the management controller contains a plurality of sensor data record objects in a sensor data record repository, wherein a plurality of the sensor data record objects contain data received from the plurality of sensors, and at least one additional sensor data record object contains a property descriptor;
wherein the property descriptor references a property data object accessible to the management controller;
wherein the sensor data record objects and the property data objects are configured to be read through an interface, and wherein the property data objects are configured to be written through the interface to control the computer system.

2. The system of claim 1, further comprising a management computer coupled to the interface for providing commands to the management controller.

3. The system of claim 2, wherein the interface operates according to the Intelligent Platform Management Interface protocol.

4. The system of claim 1, wherein the computer system is a partitioned computing system having partition control registers, and wherein the partition control registers are configured to be written through the property data objects.

5. The system of claim 4, wherein the partition control registers include protection domain registers.

6. The system of claim 1, wherein at least some of the sensors are coupled to the management controller through a satellite management controller.

7. The system of claim 1, wherein the property data objects are configured to be locked such that they are configured to be read coherently with multiple read operations.

8. The system of claim 1, wherein reading a first of the property data objects provides a mechanism for reading state information of a feature of the computer system, and wherein writing the first of the property data objects provides a mechanism for controlling the feature of the computer system.

9. An improvement of baseboard management controllers for computer systems controllable through an Intelligent Platform Management Interface, wherein the improvement comprises:
providing a sensor data object on a management controller, the sensor data object indicative of a property data object configured to be read and written through the Intelligent Platform Management Interface, wherein the property data object is configured to be read to provide state information of a feature of the computer system, and wherein the property data object is configured to be written to control the feature of the computer system.

10. The baseboard management controller of claim 9 wherein the property data object is located in a subsidiary management controller and accessible through the baseboard management controller.

11. The baseboard management controller of claim 9, wherein the property data object is configured to be locked to permit coherent reading with multiple read commands.

* * * * *